Dec. 24, 1940.   W. N. NICHOLLS   2,225,792
DRY ICE REFRIGERATOR
Filed Feb. 13, 1939
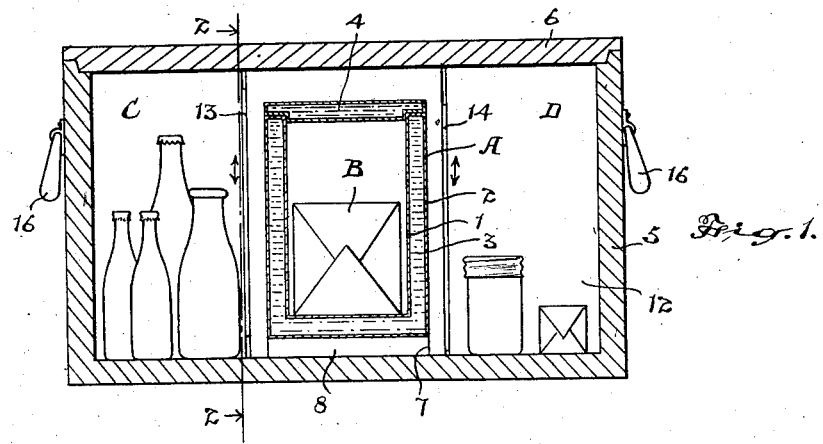
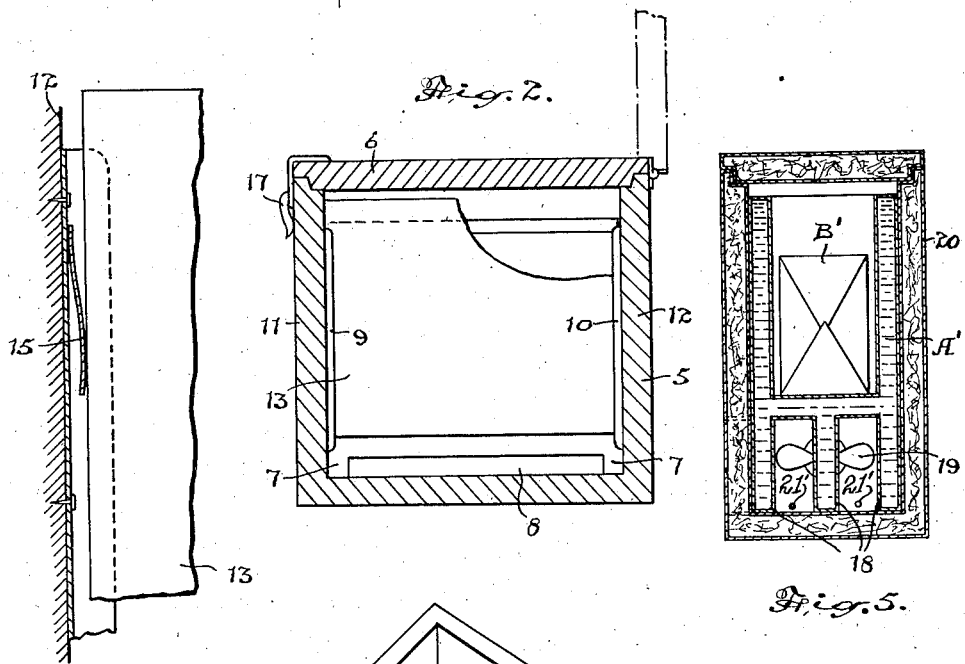
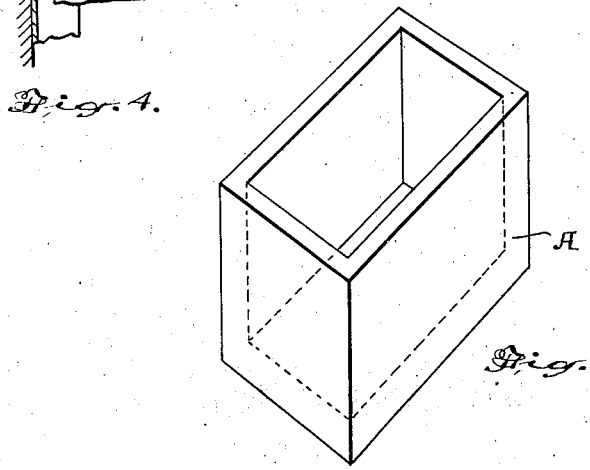
Inventor.
Walter N. Nicholls

Patented Dec. 24, 1940

2,225,792

UNITED STATES PATENT OFFICE 2,225,792

DRY ICE REFRIGERATOR

Walter N. Nicholls, Toronto, Ontario, Canada

Application February 13, 1939, Serial No. 256,039

5 Claims. (Cl. 62—91.5)

The principal objects of this invention are to overcome difficulties experienced in the use of dry ice for refrigerating or cooling purposes and to enable the maintenance of cooling temperatures which will not be liable to go below freezing temperatures whereby the field of usefulness of dry ice is greatly extended.

A further and important object is to provide an improved form of cooling unit adapted to receive a charge of dry ice and to be placed in a cooling cabinet or the like to achieve a controlled absorption of heat from the air within said cabinet.

The principal feature of the invention resides in the novel construction of a dry ice container with double walls which form a water reservoir about the dry ice thereby providing an insulating ice stratum between the dry ice and the cooling chamber as a means of effectively controlling the rate of heat absorption from the atmosphere of said chamber.

A further and important feature resides in the novel provision of insulating control baffles adjustably mounted in relation to the cooling unit as a means of accurately controlling the rate of heat absorption by the unit from adjacent cooling chambers.

In the drawing

Figure 1 is a longitudinal sectional elevation showing a cooling unit and cabinet constructed in accordance with the present invention.

Figure 2 is a transverse section on the line 2—2 of Figure 1.

Figure 3 is a perspective view of the cooling unit for containing the dry ice showing the cover removed.

Figure 4 is an enlarged fragmentary vertical sectional view through one of the guide members for adjustably supporting the insulating partition.

Figure 5 is a sectional elevation illustrating a modified form of the invention applied to a room-cooling unit.

The use of dry ice which is solid carbon dioxide, for ordinary cooling purposes where temperatures below freezing must be avoided, has met with little or no encouragement principally due to the difficulty of controlling the rate of absorption of heat by the dry ice from the surrounding atmosphere or interior of the cooling cabinet or refrigerator in which the dry ice might be located.

The principal use of dry ice has invariably been restricted to the fields where low temperatures are not harmful, such for instance as in connection with the storage or shipping of ice cream.

The present invention has been devised to extend the field of usefulness of dry ice for ordinary refrigerating or cooling purposes and will be found particularly applicable where ordinary refrigeration is not available or impractical for various reasons.

In the illustrated form of the invention I first provide a cooling unit indicated in general at A, which in the preferred form comprises a double walled metallic casing having the inner wall 1 spaced from the outer wall 2 and forming therebetween a chamber 3 which is filled with water sealed therein permanently, leaving a suitable air space to provide for expansion.

A cover 4 is provided which snugly closes the top of the casing or unit A and if desired this may also be of double-walled construction containing a body of water therebetween. The unit A is adapted to receive a block of dry ice B, the presence of which rapidly freezes the surrounding body or stratum of water so that the resultant ice enclosure forms an insulating barrier about the dry ice which definitely retards the absorption of heat by the latter, and exhaustive tests have shown that with this ice barrier formed about the charge of dry ice the unit may be directly used for cooling purposes without fear of producing dangerously low temperatures.

In Figure 1 I have shown such a unit incorporated in a cooling cabinet 5 which may conveniently be of rectangular form presenting suitable insulating walls and closed by a hinged cover 6.

The unit A may be placed centrally of the cabinet and may have spaced feet or other supports 7 to provide an air-circulating space 8 thereunder.

Channel-shaped guide members 9 and 10 are arranged in pairs secured to the front and rear walls 11 and 12 of the cabinet at either side of the cooling unit A and spaced a short distance therefrom.

Adjustable insulating partitions 13 and 14 here shown of lesser vertical height than that of the interior of the cabinet and formed of a suitable insulating material capable of minimizing direct heat transfer therethrough by conduction, are vertically slidable in the guide channels and present insulation and circulation barriers between the cooling unit and the respective cooling chambers C and D as hereinafter pointed out, and as indicated in Figure 4 a suitable spring holding means 15 is arranged in at least one of each pair of channels to frictionally engage the insulating partition and thereby effectively retain the same at any adjusted height.

Thus if it is desired to maintain the temperature in cooling chamber C lower than that obtaining in chamber D this may be readily achieved by moving the partition 13 to a position centrally between the top and bottom of the chamber, thus providing substantially uniform air spaces above and below the partition for the free circulation of air. Thus warm air from compartment C will pass over the partition 13 into the central cooling chamber where it will become cooled and will pass downwardly to re-enter chamber C by passing under the partition 13. It will be apparent that with the partition 13 in the central position shown maximum coolness will be obtained in chamber C and that this coolness is readily controllable by adjustment of the partition to a lower position to restrict the air circulation thereunder. Thus when moved to its lowermost position in sealing contact with the bottom, the air circulation defined will be cut off and the rate of heat exchange between the chamber C and the central chamber is then determined by the insulating value of the partition and the very limited local circulation permitted over the top of the lowered partition.

With partition 14 only very slightly raised as shown, a very restricted air circulation is permitted over and under the same. An extremely accurate control of the circulation and rate of heat interchange is thereby provided.

For certain purposes such as camping or motoring the cabinet may be in the form of a readily portable unit having suitable carrying handles 16 secured thereto and suitable fastening means for the cover may be provided as indicated at 17.

In the adaptation of the present invention to room-cooling purposes, an example of which is illustrated in Figure 5, the cooling unit A' is shown provided with downwardly-extending double walled or tubular extensions 18 which are also charged with water and maintained in a frozen state by the charge of dry ice B'. An air-circulating fan 19 is arranged to circulate air from a room in which the unit is placed so that the air contacts the extensive surfaces of the cooling unit so that the heat is absorbed therefrom in a desirable gradual manner which would not be possible if direct heat interchange was permitted with the dry ice or the wall of the chamber not so insulated. Suitable means may be provided such as drain pipes 21', for conducting away any condensate.

The unit may advantageously be mounted in a suitable insulating cabinet 20.

The invention as defined is capable of being carried out in a simple and inexpensive manner and while various forms of structure may be devised for carrying the invention into effect such alterations may be made within the essential spirit of the invention, and while I prefer to employ water as the filling medium for the double-walled cooling unit, I may find it advantageous for certain purposes to employ a different filling medium which will present insulating characteristics when subjected to low temperature from within, which are suitable for the purpose of the present invention.

What I claim as my invention is:

1. The combination of a cooling cabinet, a dry ice cooling unit in said cabinet and including hollow walls charged with a freezable liquid adapted to act as an effective heat-insulating medium under the cooling influence of a charge of dry ice placed in said unit, and adjustable circulating control means vertically disposed adjacent said cooling unit and forming with the side, top and bottom walls of the cabinet at least one cooling chamber spaced horizontally from said cooling unit and being adjustable vertically to provide controlled air circulation from the cooling chamber to the cooling unit at the top and from the cooling unit to the cooling chamber at the bottom.

2. Means as claimed in claim 1 in which said adjustable means comprises vertically adjustable insulating partitions disposed respectively at opposite sides of the cooling unit in horizontally spaced relation thereto and segregating the interior of the cabinet into horizontally spaced cooling compartments, said partitions being independently vertically adjustable to control the volume of free circulation between said respective cooling chambers and the cooling unit over and under said partitions.

3. In a dry ice cooling device, a horizontally elongated cabinet, vertical insulating partitions sub-dividing said cabinet into a horizontal series of chambers including a central chamber, a dry ice cooling unit disposed in said central chamber, said insulating partitions being of lesser vertical height than the interior vertical height of the cabinet and being individually vertically adjustable to selectively control the circulation into and out of the outer chambers from said central chamber, vertical guides on the side walls of the cabinet supporting said partitions for vertical sliding adjustment, and means being provided for holding the partitions at their selectively adjusted levels.

4. A device as claimed in claim 3 in which said partitions are engaged at their vertical edges in channel guides secured on the opposite side walls of the cabinet, and spring-retaining members frictionally engage the edges of the partitions within said channel guides to hold the partitions in their adjusted positions.

5. A device as claimed in claim 3 in which said partitions are selectively movable into sealing contact with the bottom of the cabinet to completely cut off free circulation of air therebelow between the central dry ice containing chamber and the adjacent chamber or chambers.

WALTER N. NICHOLLS.